July 29, 1924.

F. BERGER

COOKING UTENSIL

Filed Oct. 8, 1923

1,502,843

Inventor
Frank Berger

By
Odel Billman Attorney

Patented July 29, 1924.

1,502,843

UNITED STATES PATENT OFFICE.

FRANK BERGER, OF STOUGHTON, WISCONSIN.

COOKING UTENSIL.

Application filed October 8, 1923. Serial No. 667,148.

*To all whom it may concern:*

Be it known that I, FRANK BERGER, a citizen of the United States, residing at Stoughton, in the county of Dane and State of Wisconsin, have invented certain new and useful Improvements in Cooking Utensils, of which the following is a specification.

My invention relates to improvements in cooking utensils, the present embodiment of the invention relating more particularly to that class or type commonly known as "frying pans" or skillets used in various cooking operations, such as frying, baking, boiling, and the like.

The primary object of my invention is to provide a generally improved utensil of the type or class indicated, which will be exceedingly simple in construction, cheap of manufacture, and efficient in use.

A further and very important object is the provision of an improved cooking pan or receptacle adapted to take up and more evenly or uniformly distribute the heat at the active heating or cooking surfaces through the medium of spaced bottoms or sections, together with improved heat transmitting bottom connecting and spacing elements properly and evenly distributed between the spaced bottom sections.

With the above mentioned and other ends in view, the invention consists in the novel construction, arrangement and combination of parts, hereinafter described, illustrated in some of its embodiments in the accompanying drawings, and particularly pointed out in the appended claims.

Figure 1:
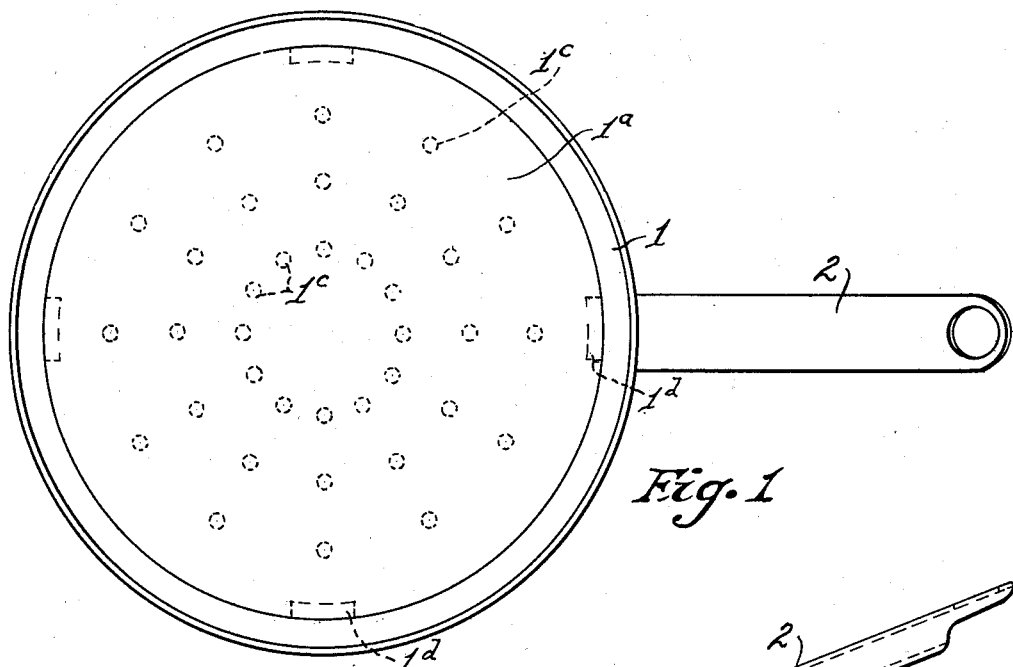

Referring to the drawings, forming a part of this specification, Figure 1 is a top plan view of a frying pan or spider, constructed in accordance with this invention.

Figure 2:
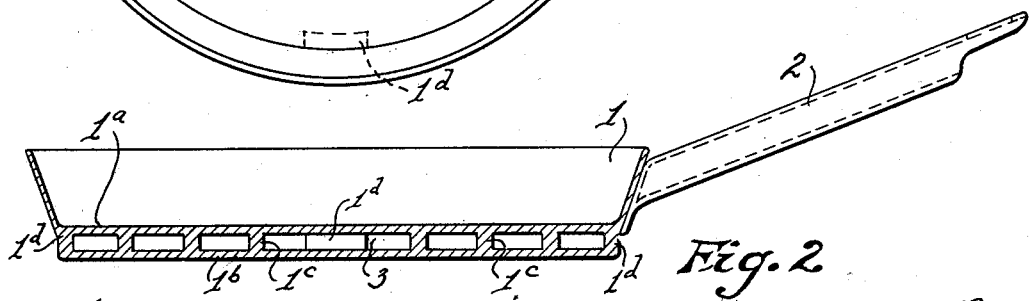

Fig. 2, a central vertical section of the same.

Figure 3:
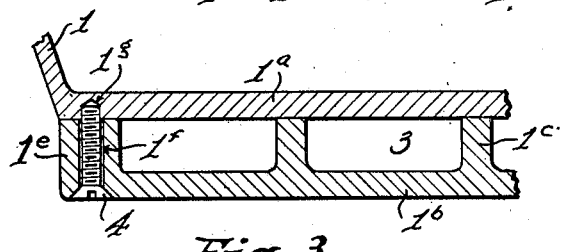

Fig. 3, an enlarged fragmentary sectional view of a modified form in which the true and false bottoms are separate and detachably connected together.

Figure 4:
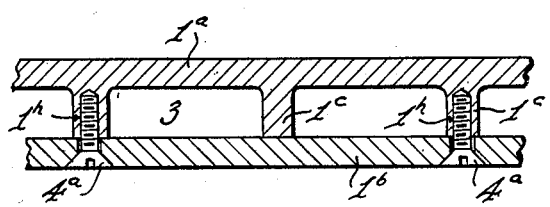

Fig. 4, a similar view of a further modified form.

Figure 5:
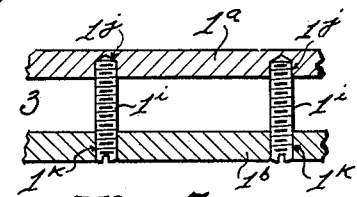

Fig. 5, a similar view of a still further modified form in which the bottom connecting and spacing elements are separately formed and applied in the specific form of screws.

Figure 6:
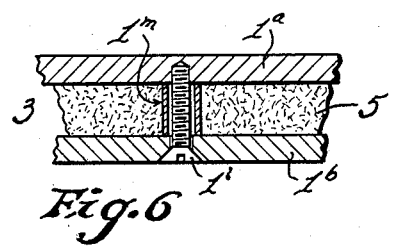

Fig. 6, a similar view of a still further modified form including a further modification of bottom connecting and spacing element.

Similar numerals of reference designate like parts throughout all the figures of the drawings.

The vessel or receptacle 1, may be of any suitable and convenient form or type and so likewise the handle 2. In the present instance, the receptacle is in the specific form of a pan or spider provided with the usual upwardly and outwardly inclined or flaring rim.

As a means of more evenly receiving and distributing the heat to the active heating or cooking surfaces of the receptacle and thus guarding against the food being prepared against over heating or burning at one point and becoming under heated or underdone at another point, I provide the improved utensil or vessel with spaced bottoms $1^a$ and $1^b$, or what are generally known as true and false bottoms $1^a$ and $1^b$, respectively. The bottom members or sections $1^a$ and $1^b$ preferably extend parallel with each other, as shown, conjointly forming an intervening space 3.

The true and false bottoms $1^a$ and $1^b$, respectively, may be either cast integral as a one-piece utensil or receptacle, as shown in Figs. 1 and 2 of the drawings, or if desired, said spaced bottom sections may be formed separate and attached to each other, as shown in Figs. 3 to 6, inclusive, of the drawings.

As a means of uniformly or equally distributing or transmitting the heat units from the false bottom $1^b$ to the main or true bottom $1^a$ and the intervening space 3, as well as connecting and spacing the bottom members or sections $1^a$ and $1^b$, I provide a series or plurality of equally spaced heat transmitting bottom connecting and spacing elements $1^c$, as shown. In the form shown in Figs. 1 and 2 of the drawings the elements $1^c$ are in the specific form of round lugs or connecting elements cast integral with the bottoms $1^a$ and $1^b$ and in this instance the false bottom $1^b$ is connected to the main or true bottom $1^a$ by means of said spacing elements $1^c$ and integral rim sections or members $1^d$, the latter in the present instance being four in number and equally spaced, as shown most clearly in Fig. 1 of the drawings.

In the form shown in Figs. 3 and 4 of the drawings the transmitting and spacing elements 1ᶜ are formed integral with one or the other of the bottoms 1ᵃ and 1ᵇ and in the form shown in Fig. 3 the false bottom is made separately and extends upwardly as at 1ᵉ, being provided with suitable screw receiving openings 1ᶠ, and screws 4, extending into suitable threaded openings 1ᵍ in the main or true bottom 1ᵃ.

In the form shown in Fig. 4 of the drawings the heat transmitting and spacing elements 1ᶜ extend downwardly from the main or true bottom 1ᵃ and are provided with screw receiving openings 1ʰ, adapted to receive screws 4ᵃ, extending through suitable openings in the false bottom 1ᵇ.

If desired, the heat transmitting and bottom spacing elements may take the specific form of screw bolts 1ⁱ, as shown in Fig. 5 of the drawings, and in which instance the threaded elements 1ⁱ are screwed into threaded openings 1ʲ in the underside of the main or true bottom 1ᵃ and through threaded openings 1ᵏ in the false bottom.

Furthermore, if desired, the intervening space 3 may be utilized as a receptacle or chamber for receiving and carrying a filling material 5 of relatively great heat conductivity, as shown in Fig. 6 of the drawings, and if desired, the connecting and spacing element may take the specific form of a screw 1ˡ and a spacing sleeve 1ᵐ, as shown.

In the form shown in Figs. 1 and 2 the receptacle is cast in one piece and the intervening space 3 and connecting and spacing elements 1ᶜ and 1ᵈ are provided by means of a suitable core in the casting operation.

Having thus described some of the embodiments of my invention, without having attempted to set forth all the forms in which it may be made, or all the modes of its use, what I claim and desire to secure by Letters Patent is,—

1. A cooking receptacle including spaced cast bottom sections, one of said bottom sections being provided with raised rim portions extending upwardly against the bottom and connected thereto and having a series of regularly spaced heat transmitting stud elements extending to the underside of the other bottom section.

2. A cast frying pan, including spaced disc-shaped cast bottom sections, one of said bottom sections being provided with raised rim portions abutting against the rim portion of the other and having a series of regularly spaced heat transmitting elements arranged in concentric rows between said bottom sections, and means for connecting said bottom sections to each other.

In testimony whereof I have affixed my signature.

FRANK BERGER.